United States Patent
Lambert et al.

(10) Patent No.: US 12,117,897 B2
(45) Date of Patent: Oct. 15, 2024

(54) SYSTEM AND METHOD FOR MANAGING CONDITIONS IMPACTING POWER SUPPLIES OF DATA PROCESSING SYSTEMS

(71) Applicant: Dell Products L.P., Round Rock, TX (US)

(72) Inventors: Timothy M. Lambert, Austin, TX (US); Craig Anthony Klein, Elgin, TX (US)

(73) Assignee: Dell Products L.P., Round Rock, TX (US)

( * ) Notice: Subject to any disclaimer, the term of this patent is extended or adjusted under 35 U.S.C. 154(b) by 97 days.

(21) Appl. No.: 18/159,910

(22) Filed: Jan. 26, 2023

(65) Prior Publication Data

US 2024/0256378 A1  Aug. 1, 2024

(51) Int. Cl.
| | |
|---|---|
| *G06F 11/00* | (2006.01) |
| *G06F 1/30* | (2006.01) |
| *G06F 11/07* | (2006.01) |
| *G06F 11/30* | (2006.01) |

(52) U.S. Cl.
CPC ............ *G06F 11/0793* (2013.01); *G06F 1/30* (2013.01); *G06F 11/0784* (2013.01); *G06F 11/3058* (2013.01)

(58) Field of Classification Search
CPC .... G06F 1/30; G06F 11/0784; G06F 11/0793; G06F 11/3058
See application file for complete search history.

(56) References Cited

U.S. PATENT DOCUMENTS

| | | | |
|---|---|---|---|
| 7,308,705 B2 | 12/2007 | Gordy et al. | |
| 7,970,279 B2 | 6/2011 | Dress | |
| 8,595,535 B1 * | 11/2013 | Tamilarasan | G06F 11/3062 |
| | | | 700/297 |
| 9,331,899 B2 | 5/2016 | Christopher et al. | |
| 9,684,575 B2 | 6/2017 | Breakstone et al. | |
| 10,019,388 B2 | 7/2018 | Long et al. | |
| 10,261,561 B2 | 4/2019 | Chuang et al. | |
| 10,733,116 B2 | 8/2020 | Litichever et al. | |
| 11,029,742 B2 | 6/2021 | Webel et al. | |
| 11,112,846 B2 | 9/2021 | Strach et al. | |
| 2002/0194415 A1 * | 12/2002 | Lindsay | G06F 1/3203 |
| | | | 710/305 |
| 2005/0223251 A1 * | 10/2005 | Liepe | H03K 19/0008 |
| | | | 713/322 |

(Continued)

OTHER PUBLICATIONS

"DC-MHS R1 Overview," 2022 OCP Global Summit (56 Pages).

(Continued)

*Primary Examiner* — Joshua P Lottich
(74) *Attorney, Agent, or Firm* — Womble Bond Dickinson (US) LLP (57) ABSTRACT

Methods and systems for managing operation of data processing systems are disclosed. The data processing systems may include power supplies that may be impacted by various conditions. To manage exposure to the conditions, the power supplies may self-monitor for occurrences of the conditions and report the occurrences to a logic device using a point-to-point channel. The logic device automatically identify and implement actions to reduce an impact of the occurrences of the conditions.

20 Claims, 4 Drawing Sheets

(56) References Cited

U.S. PATENT DOCUMENTS

| | | | |
|---|---|---|---|
| 2007/0233402 A1* | 10/2007 | Li | G06F 1/206 702/33 |
| 2008/0126629 A1 | 5/2008 | Huang | |
| 2009/0300329 A1 | 12/2009 | Naffziger et al. | |
| 2010/0169690 A1* | 7/2010 | Mundada | G06F 1/3225 713/340 |
| 2011/0078479 A1* | 3/2011 | Vogman | H05K 7/20836 713/340 |
| 2012/0272086 A1* | 10/2012 | Anderson | G06F 1/206 713/340 |
| 2013/0100568 A1* | 4/2013 | Mistry | H02H 3/006 361/103 |
| 2015/0286262 A1* | 10/2015 | Park | G05D 23/1917 713/320 |
| 2015/0355651 A1* | 12/2015 | Balakrishnan | G06F 11/3031 700/299 |
| 2016/0006299 A1* | 1/2016 | Myhre | H02M 3/04 307/66 |
| 2016/0077579 A1* | 3/2016 | Gulati | G06F 1/3296 713/323 |
| 2016/0349812 A1* | 12/2016 | Goh | G06F 11/3058 |
| 2017/0046233 A1* | 2/2017 | Shivanna | G06F 11/1464 |
| 2017/0147052 A1 | 5/2017 | Waters et al. | |
| 2019/0243685 A1* | 8/2019 | Guim Bernat | G06F 1/30 |
| 2022/0130432 A1 | 4/2022 | Jayapal et al. | |
| 2022/0253120 A1* | 8/2022 | Rapaka | G06F 1/324 |

OTHER PUBLICATIONS

Kennedy, Jeff et al., "Peripheral Sideband Tunneling Interface (M-PESTI)," Datacenter—Modular Hardware Systems (DC-MHS) Rev 1.0, Apr. 27, 2022 (50 Pages).

"Why won't the computer wake up when connected over USB," Belkin Official Support, Web Page <https://www.belkin.com/support-article/?articleNum=8130>, accessed on Oct. 17, 2022 (2 Pages).

"Clock Gating for Power Reduction," CoQube Analytics and Services, 2021, Web Page <https://coqube.com/clock-gating-for-power-reduction/>, accessed on Oct. 17, 2022 (12 Pages).

Kennedy, Patrick, "Liquid Cooling Next-Gen Servers Getting Hands-on with 3 Options," ServeTheHome, Aug. 2, 2021, Web Page <https://www.servethehome.com/liquid-cooling-next-gen-servers-getting-hands-on-3-options-supermicro/4/>, accessed on Oct. 17, 2022 (10 Pages).

\* cited by examiner

SYSTEM AND METHOD FOR MANAGING CONDITIONS IMPACTING POWER SUPPLIES OF DATA PROCESSING SYSTEMS

FIELD

Embodiments disclosed herein relate generally to operation management. More particularly, embodiments disclosed herein relate to systems and methods to manage conditions impacting power supplies for data processing systems.

BACKGROUND

Computing devices may provide computer implemented services. The computer implemented services may be used by users of the computing devices and/or devices operably connected to the computing devices. The computer implemented services may be performed with hardware components such as processors, memory modules, storage devices, and communication devices. The operation of these components and the components of other devices may impact the performance of the computer implemented services.

BRIEF DESCRIPTION OF THE DRAWINGS

Embodiments disclosed herein are illustrated by way of example and not limitation in the figures of the accompanying drawings in which like references indicate similar elements.

DETAILED DESCRIPTION

Various embodiments will be described with reference to details discussed below, and the accompanying drawings will illustrate the various embodiments. The following description and drawings are illustrative and are not to be construed as limiting. Numerous specific details are described to provide a thorough understanding of various embodiments. However, in certain instances, well-known or conventional details are not described in order to provide a concise discussion of embodiments disclosed herein.

Reference in the specification to "one embodiment" or "an embodiment" means that a particular feature, structure, or characteristic described in conjunction with the embodiment can be included in at least one embodiment. The appearances of the phrases "in one embodiment" and "an embodiment" in various places in the specification do not necessarily all refer to the same embodiment.

References to an "operable connection" or "operably connected" means that a particular device is able to communicate with one or more other devices. The devices themselves may be directly connected to one another or may be indirectly connected to one another through any number of intermediary devices, such as in a network topology.

In general, embodiments disclosed herein relate to methods and systems for managing operation of data processing systems. To manage the operation of data processing systems, conditions impacting power supplies that power the data processing systems may be monitored. When an occurrence of a condition is identified, a report regarding the occurrence may be provided to a logic device via a point-to-point channel.

The logic device may identify one or more actions to be performed responsive to occurrences of the conditions. For example, if the occurrence is a temperature of a power supply exceeding a threshold value, then the actions may include reducing power consumption by managed devices through assertions of over temperature with respect to the managed devices. By doing so, the managed device may automatically modify their activity to reduce power consumption thereby likely decreasing heat generation by the power supply due to reduce power draw. The actions may depend on the type of the condition, an identity of the entity that is impacted by the condition, and/or other information such as the value sensed condition giving rise to the conclusion that a condition exists.

By doing so, a data processing system in accordance with an embodiment may be more likely to be able to provide desired computer implemented services through reduced time to respond to occurrences of conditions impacting power supplies. For example, directly communicating with power supplies and operating substantially in real-time, the logic device may identify and automatically perform actions to attempt to reduce an impact of the occurrences of the conditions.

In an embodiment, a method for managing operation of a data processing system is provided. The method may include identifying, by a power supply, a change in a sensed quantity that triggers an alert; obtaining, by the power supply and to a logic device, a report regarding the sensed quantity via a channel; identifying, by the logic device and based on the report, a provider of the report, a source that caused the change in the sensed quantity, and a value for at least one parameter that caused the change in the sensed quantity to be identified; selecting, by the logic device and based on the provider, the source, and the value, an action set; and performing, by the logic device, the action set to attempt to remediate the alert.

The channel may be a modular peripheral sideband tunneling interface, and the sensed quantity is a temperature that exceeds a threshold which triggers the alert.

The report may be sent via a virtual wire (e.g., a logical wire, implemented digitally) over the channel, and the logic device associates the virtual wire with the source that caused the change in the sensed quantity.

Performing the action set may include making an assertion (e.g., by modifying a register of a managed device to indicate an over temperature condition is present), by the logic device, that a managed device is over temperature; and reducing, by the managed device and responsive to the assertion, power consumption while the assertion is in force.

The method may also include identifying, by the power supply, a second change in the sensed quantity that resolves the alert; providing, by the power supply and to the logic device, a second report regarding the second change in the sensed quantity via the channel; performing, by the logic device, a second action set to remove the assertion.

The method may further include, prior to identifying the change in the sensed quantity: configuring, by a management controller or the logic device, the power supply to provide instances of the report when the sensed quantity exceeds the threshold.

The modular peripheral sideband tunneling interface may operate substantially in real-time (e.g., may include some delay but may not buffer responses or delay processing of input).

The modular peripheral sideband tunneling interface may be a point to point interface.

In an embodiment, a non-transitory media is provided. The non-transitory media may include instructions that when executed by a processor cause the method to be performed.

In an embodiment, a data processing system is provided. The data processing system may include the non-transitory media, and a hardware device, and may perform the method when the computer instructions are executed by the hardware device.

Figure 1:
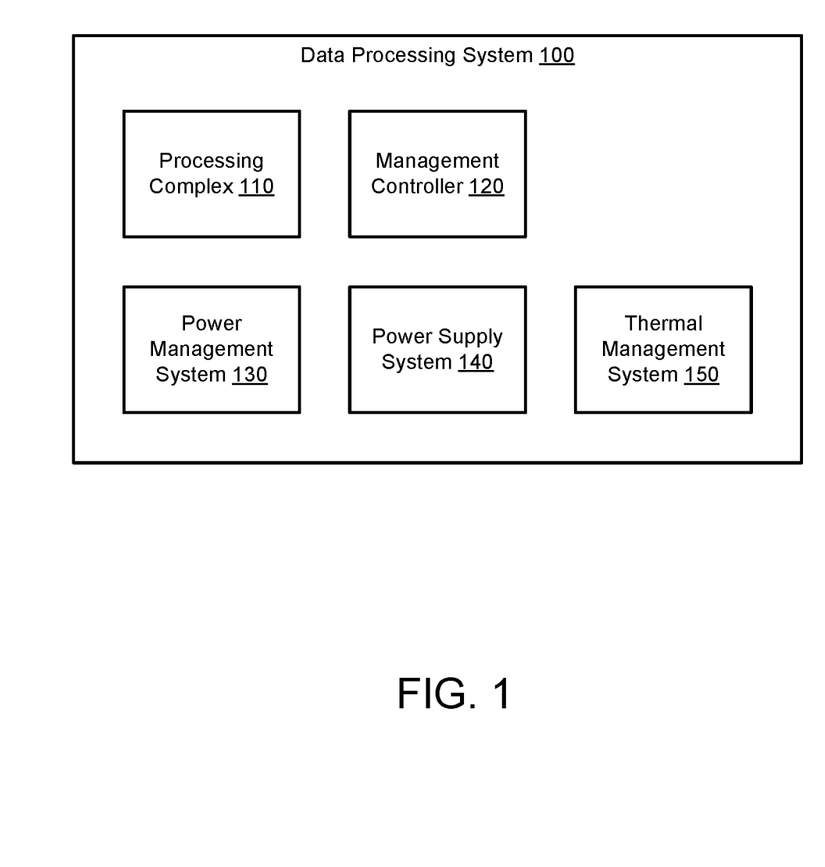
FIG. 1 shows a block diagram illustrating a system in accordance with an embodiment.

Turning to FIG. 1, a block diagram illustrating a system in accordance with an embodiment is shown. The system shown in FIG. 1 may provide computer implemented services. The computer implemented services may include any type and quantity of computer implemented services. For example, the computer implemented services may include data storage services, instant messaging services, database services, and/or any other type of service that may be implemented with a computing device.

To provide the computer implemented services, the system may include any number of data processing system 100. Data processing system 100 may provide the computer implemented services to users of data processing system 100 and/or to other devices (not shown).

To provide the computer implemented services, data processing system 100 may include various hardware components (e.g., processors, memory modules, storage devices, etc.) and host various software components (e.g., operating systems, application, startup managers such as basic input-output systems, etc.). These hardware and software components may provide the computer implemented services via their operation.

For example, data processing system 100 may include a processing complex 110 that includes a processor and memory modules. These hardware components may provide processing functionality. Data processing system 100 may include any number and types of hardware components.

To operate, the hardware components may consume power and generate heat. The power may be provided in accordance with expectations of the hardware components (e.g., voltage/current levels) which, if not met, may cause the hardware components to not operate nominally (e.g., in an expected manner). If the hardware components do not operate nominally, the computer implemented services provided by data processing system 100 may be impaired (e.g., not provided at all, provided at reduced levels of quality, provided with errors or other types of undesired outcomes, etc.).

In addition to power, the hardware components may also include nominal thermal ranges in which they may operate as expected. Temperatures exceeding the nominal thermal ranges may cause the hardware components to be impaired.

In general, embodiments disclosed herein may provide methods, systems, and/or devices for providing computer implemented services. To provide the computer implemented services, data processing system 100 may monitor the operation of support systems such as power management system 130, power supply system 140, and thermal management system 150 in substantially real-time. Based on the operation of these systems, data processing system 100 may proactively perform actions to reduce the impact of changes in the operation of the support systems. By doing so, data processing system 100 may be more likely to be able to provide computer implemented services.

To do so, data processing system may include management controller, and the support systems, discussed above. Each of these components is discussed above.

Power management system 130 may include one or more devices to monitor the operation of power supplies, thermal management devices, and/or other devices that may provide support services for data processing system 100. Based on the monitoring, power management system 130 may initiate performance of various actions to proactively (and/or reactively) address changes in the operations of these systems that may impact other components.

Power management system 130 may be implemented using, for example, a digital logic device such as a complex programmable logic device. The digital logic device may be an independent device (e.g., a chip) or may be a portion of another device. The digital logic device may be programmable, and include functionality to communicate with other devices via point to point communication channels, and shared communication channels (e.g., a shared bus). Additionally, the digital logic device may include functionality to make various assertions to other devices (e.g., processors/memory modules of processing complex 110) by, for example, outputting various digital logic signals read by the other devices. For example, the digital logic device may be cable of asserting that other devices are over temperature or otherwise impaired. Consequently, the other devices may automatically perform actions responsive to these assertions. For example, the other devices may throttle themselves (e.g., decrease power consumption by limiting their functionality).

Power supply system 140 may include one or more power supplies. The power supplies may include functionality to self-monitor their operation (e.g., various voltage/current levels, various temperatures, etc.), identify whether the monitoring indicates impairments (e.g., such as low input voltages or high temperatures which may prevent the power supplies from outputting desired levels of voltage/current), and communication with other devices via point-to-point and shared channels.

Additionally, power supply system 140 may include functionality to implement a virtual wire scheme on point-to-point channels. The virtual wire scheme may allow the power supplies to treat a digital channel as a set of wires over which different signals may be transmitted to other devices to indicate various information regarding the operation of a power supply.

The power supplies of power supply system 140 may operate independently or cooperatively (e.g., such as redundantly, or in parallel to manage higher levels of power draw than could be supported by an individual power supply).

Thermal management system 150 may include one or more fans or other types of cooling devices usable to manage the temperatures of various hardware components, such as the processors and memory modules of processing complex 110. Thermal management system 150 may also include management devices such as a controller that may communicate with power management system 130 thereby allowing the operation of the fans or other devices to be managed by power management system 130.

Management controller 120 may include functionality to (i) manage setup of the operation of power management system 130 and power supply system 140, (ii) manage the operation of thermal management system 150, and/or (iii) obtain information regarding management decisions from power management system 130. Management controller 120 may be implemented using, for example, a baseboard management controller, an out of band management controller, or another type of computing devices which may operate independently from data processing system 100. Management controller 120 may be implemented using, for example, a system on a chip or assembly, and may be operably connected to but may operate independently from processing complex 110. Management controller 120 may include functionality to, for example, communicate with other hardware components via out-of-band channels thereby allowing management controller 120 to modify the operation of the other hardware components.

Figure 2:
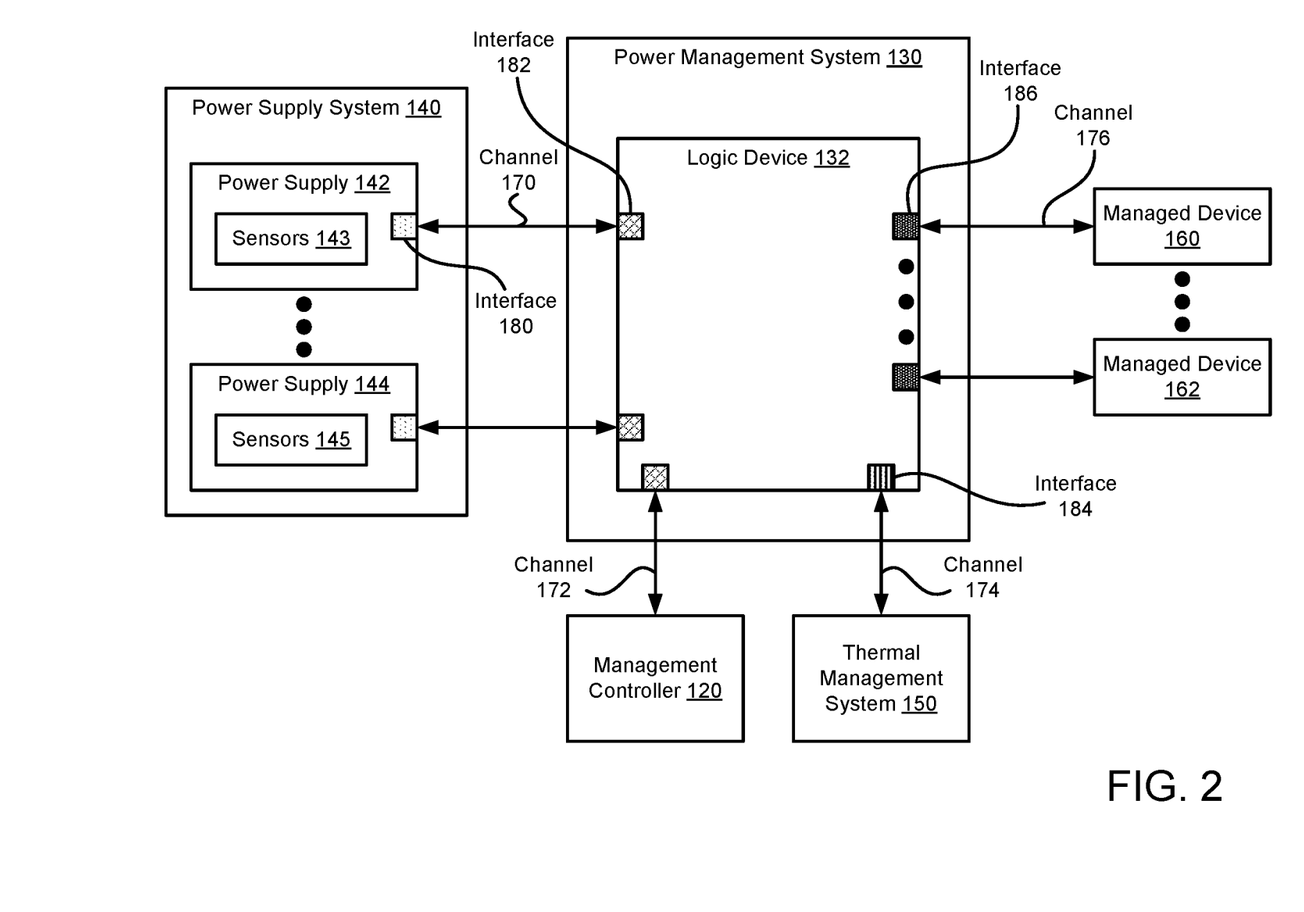
FIG. 2 show diagram illustrating components of a data processing system in accordance with an embodiment.

Refer to FIG. 2 for additional details regarding management controller 120, power management system 130, power supply system 140, and thermal management system 150.

Figure 3:
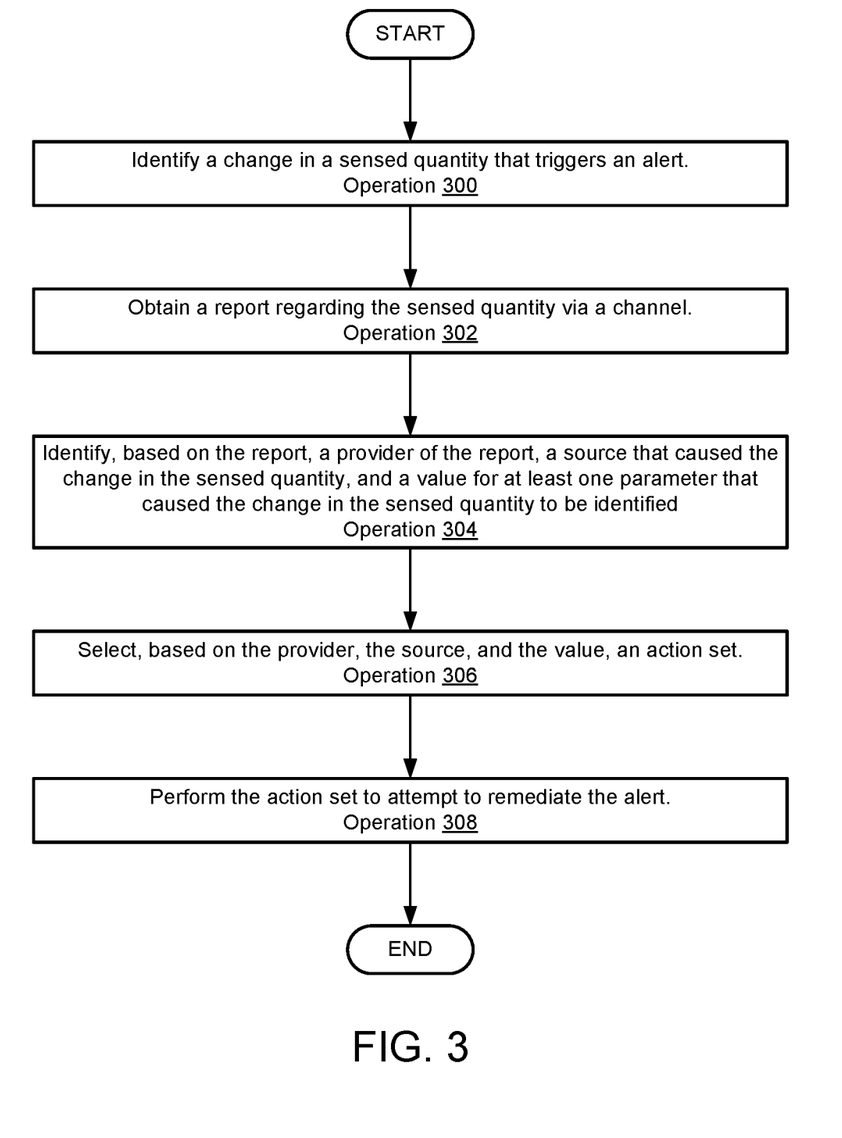
FIG. 3 shows a flow diagram illustrating a method of managing the operation of data processing systems in accordance with an embodiment.

When providing its functionality, data processing system 100, or components thereof, may perform all, or a portion, of the method illustrated in FIG. 3.

Data processing system 100 may be implemented using a computing device (also referred to as a data processing system) such as a host or a server, a personal computer (e.g., desktops, laptops, and tablets), a "thin" client, a personal digital assistant (PDA), a Web enabled appliance, a mobile phone (e.g., Smartphone), an embedded system, local controllers, an edge node, and/or any other type of data processing device or system. For additional details regarding computing devices, refer to FIG. 4.

While illustrated in FIG. 1 as including a limited number of specific components, a system in accordance with an embodiment may include fewer, additional, and/or different components than those illustrated therein.

Turning to FIG. 2, a first diagram illustrating a portion of modules of data processing system 100 in accordance with an embodiment is shown.

To provide power to hardware components, power supply system 140 may include any number of power supplies (e.g., 142, 144). The power supplies may operate cooperatively or independently from one another.

Each of the power supplies may include functionality to self-monitor. For example, power supply 142 may include any number of sensors 143 (other power supplies may include similar or different sensors 145) usable to monitor temperatures, voltage levels, current levels, and/or other quantities. Power supply 142 may compare these monitored quantities to thresholds or other criteria. When a criteria is met, a corresponding condition may be considered to be present. For example, the condition may an over or under voltage, an elevated temperature of a component, etc.

Power supply 142 may, when a criteria is met, generate and send a report regarding the criteria to power management system 130 via a channel (e.g., 170). The report may indicate (i) the type of condition that exists, (ii) the value of the monitored quantity leading to the condition being identified as existing, and/or (iii) information regarding components (or modules or other types of groups of portions of a power supply) which was monitored that indicates the existence of the condition. The report may include other types of information without departing from embodiments disclosed herein.

The criteria implemented by power supply 142 may be obtained from management controller 120. For example, management controller 120 may have information regarding multiple power supplies, and may set the criteria based on the information. Depending on the setup of the multiple power supplies, the criteria may vary (e.g., if power supplies are operating redundantly then high thresholds may be used, whereas if the power supplies are operating independent or cooperatively then the thresholds may be set lower to cause reports to be sent with increased frequency and/or earlier on during failure or impairment processes).

To provide the reports to power management system 130 (or more specifically, logic device 132, discussed in greater detail below), power supply 142 may be operably connected to power management system 130 via channel 170 and/or other channels (not shown).

Channel 170 may be implemented with a point-to-point channel such as a modular peripheral sideband tunneling interface channel. Channel 170 may connect interface 180 of power supply 142 to an interface (e.g., 182) of power management system 130. Similar channels and interfaces may be available for other power supplies.

Power management system 130 may include logic device 132 (e.g., a complex programmable logic device, or other programmable hardware component). Logic device 132 may (i) obtain reports from the power supplies (e.g., 142, 144), (ii) identify actions to be performed based on the reports, and/or (iii) initiate performance of and/or perform the actions.

The actions may include, for example, (i) reporting occurrences of the records and/or responses to the records to management controller 120 (e.g., via channel 172, may be similar to channel 170), (ii) making assertions with respect to various devices such as managed devices 160-162, and/or (iii) managing the operation of thermal management system 150 based on the reports. The assertions may include, for example, asserting that a managed device is over temperature. The operation of the thermal management system may be managed by initiating changes (e.g., by sending instructions to devices or device controllers) in airflow generation rates by various fans and/or other components.

To make the assertions, logic device 132 may include functionality to modify values of registers used by the managed devices. For example, logic device 132 may be operably connected to the managed devices by one or more of channel 176. Channel 176 may be operably connected to a pin of managed device 160 that allows the value in the register to be changed by logic device 132 (e.g., by outputting a digital logic high or low via channel 176). The value in the register may dictate whether managed device 160 is over temperature. By modifying the value to indicate that managed device 160 is over temperature, managed device 160 may automatically reduce its power consumption (e.g., by throttling) to attempt to address the over temperature condition.

To output the digital logic signal, logic device 132 may include any number of instances of interface 186 (e.g., corresponding to respective instances of channel 176). Interface 186 may be activated by logic device 132 to output logic signals to manage the operation of managed devices (e.g., 160-162). Thus, logic device 132 may be able to manage whether managed devices 160-162 consider themselves to be over temperature.

Similarly, to manage the operation of thermal management system 150, logic device 132 may be operably connected to it by channel 174. Channel 174 may, for example, be implemented using a point-to-point or shared channel.

While some channels are shown in FIG. 2, it will be appreciated that logic device 132, power supply system 140, management controller 120, and/or other components may be operably connected to each other with additional channels. For example, a shared bus may interconnect these components and allows exchange of information. Via the shared bus, for example, management controller 120 may also manage the operation of these devices (e.g., by sending instructions to them), as well as thermal management system 150 and/or managed devices 160-162. However, in contrast to the point-to-point channels discussed above, the shared channel may introduce delays (e.g., at least due to channel congestion/contention) in communications. Consequently, if management controller 120 becomes aware of changing conditions, it may not be able to react quickly to the changing conditions with respect to modifying the operation of other components based on the changing conditions.

Logic device 132 may be a high availability device. For example, once operating after power on, logic device 132 may continue to operate without updating or other operations that may prevent it from performing various functions. In contrast, management controller 120 may be unavailable from time to time due to updating and/or other types of management operations. By utilizing logic device 132 to process reports from power supplies, the time to modify the operation of other devices to respond to changing conditions may be reduced when compared to doing so via management controller 120 (e.g., due to lower availability of communication bandwidth, and periods of time where management controller 120 is unavailable).

As discussed above, the components of FIG. 1 may perform various methods to provide computer implemented services by managing response to changing conditions. FIG. 3 illustrates a method that may be performed by the components of FIG. 1. In the diagram discussed below and shown in FIG. 3, any of the operations may be repeated, performed in different orders, and/or performed in parallel with or in a partially overlapping in time manner with other operations.

Turning to FIG. 3, a flow diagram illustrating a method for manage operation of a data processing system in accordance with an embodiment is shown. The method may be performed by data processing system 100, management controller 120, power management system 130, and/or other components of the system shown in FIG. 1.

Prior to operation 300, a management controller and/or logic device may configure the operation of the logic device and any number of power supplies by (i) providing criteria for identifying occurrences of one or more conditions impacting power supplies, and (ii) actions to be performed responsive to the occurrences of the conditions. For example, the management controller may specify (i) occurrences of which conditions are to be reported, (ii) provide information how to make the reports such as which virtual wires to use to indicate occurrences of different conditions and/or impacted portions of power supplies, and (iii) specify under what conditions the occurrences of the conditions may be resolved (e.g., when the criteria are no longer met, or only in response to instructions specify that the condition is resolved).

At operation 300, a change in a sensed quantity that triggers and alert is identified. Th alert may be for a condition impacting a power supply. The change may be identified by monitoring the sensed quantity using a sensor, comparing the monitor to a corresponding criteria, and making the identification based on the comparison. If the criteria is a threshold, then the change may be identified when the sensed quantity exceeds or otherwise meets the threshold. The change may be identified by the power supply which identifies the change.

At operation 302, a report regarding the sensed quantity is obtained. The report may be obtained by a logic device. The report may be obtained by receiving it via a channel. The channel may be a point-to-point channel between the power supply and the logic device.

The report may indicate (i) a source of the report, (ii) a type of a condition that has occurred, (iii) a value of a sensed value that triggered the report. For example, the sources may be one of the power supplies, the condition may be an over temperature, an over/under voltage, an over/under current, and/or other types of conditions, and the value may be, for example, a temperature, voltage, current, etc.

The report may be obtained via a virtual wire. For example, the point-to-point channel over which the report is received may support virtual wire communications. Which wire the report is sent on may indicate some of the information from the report. For example, the virtual wire over which the report is sent may indicate a type of the condition. The source may be known based on the connectivity between the logic device and other devices.

At operation 304, based on the report, a provider of the report, a source that caused the change in the sensed quantity, and a value for at least one parameter that caused the change in the sensed quantity may be identified. For example, as noted above, some or all of the above information may be encoded in the channel and/or virtual wire over which the report is sent. The remaining information may be included in the report, such as the value of the sensed quantity.

At operation 306, an action set is selected based on the provider, the source, and the value. The action set may be selected by, for example, performing a lookup using the provider, the sources, and/or the value. The lookup may return one or more actions. The lookup may be performed using a data structure provided by the management controller. The data structure may map occurrences of conditions to actions that may be used to reduce an impact of the occurrences.

The action set may include, for example, initiating assertions against one or more managed devices, modifying the operation of the thermal management system, and/or other actions that may be used to reduce an impact of undesired operation of a power supply. For example, if a power supply experiences a voltage droop, the action set may include asserting an over temperature to reduce power consumption (which may reduce the voltage droop).

The action set may include any number and types of actions that may be used to manage the impact of any number of conditions impacting power supplies.

At operation 308, the action set is performed to attempt to remediate the alert. When performed, the action set may include, for example, (i) performing monitoring actions to identify whether the condition has been resolved, (ii) reporting the condition and corresponding actions to a management controller, (iii) if the condition is resolved automatically relieving the assertions (e.g., thereby stopping throttling of managed devices) and/or reverting changes to operation of a thermal management system, (iv) returning management authority over various devices to a management controller, and/or (v) other types of actions that may reduce an impact of the conditions impacting a power supply.

The method may end following operation 308.

Using the method illustrated in FIG. 3, a data processing system may respond more quickly to changes in condition impacting power supplies. For example, by using a logic device with direct access to information from a power supply, actions to manage the conditions impacting the power supplies may be more quickly identified and implemented responsive to changing conditions.

Figure 4:
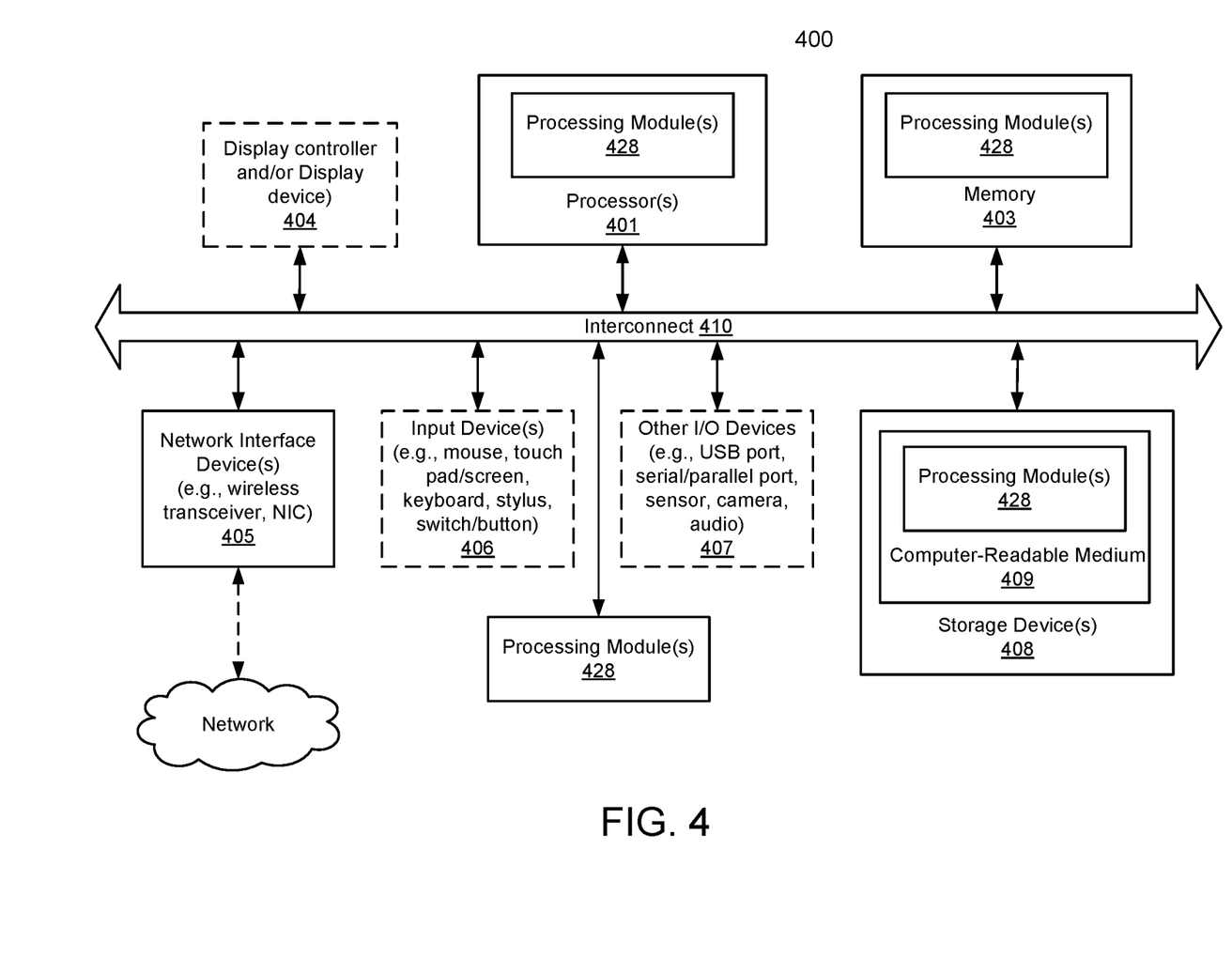
FIG. 4 shows a block diagram illustrating a data processing system in accordance with an embodiment.

Any of the components illustrated in FIGS. 1-2 may be implemented with one or more computing devices. Turning to FIG. 4, a block diagram illustrating an example of a data processing system (e.g., a computing device) in accordance with an embodiment is shown. For example, system 400 may represent any of data processing systems described above performing any of the processes or methods described above. System 400 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system. Note also that system 400 is intended to show a high level view of many components of the computer system. However, it is to be understood that additional components may be present in certain implementations and furthermore, different arrangement of the components shown may occur in other implementations. System 400 may represent a desktop, a laptop, a tablet, a server, a mobile phone, a media player, a personal digital assistant (PDA), a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 400 includes processor 401, memory 403, and devices 405-407 via a bus or an interconnect 410. Processor 401 may represent a single processor or multiple processors with a single processor core or multiple processor cores included therein. Processor 401 may represent one or more general-purpose processors such as a microprocessor, a central processing unit (CPU), or the like. More particularly, processor 401 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 401 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions.

Processor 401, which may be a low power multi-core processor socket such as an ultra-low voltage processor, may act as a main processing unit and central hub for communication with the various components of the system. Such processor can be implemented as a system on chip (SoC). Processor 401 is configured to execute instructions for performing the operations discussed herein. System 400 may further include a graphics interface that communicates with optional graphics subsystem 404, which may include a display controller, a graphics processor, and/or a display device.

Processor 401 may communicate with memory 403, which in one embodiment can be implemented via multiple memory devices to provide for a given amount of system memory. Memory 403 may include one or more volatile storage (or memory) devices such as random access memory (RAM), dynamic RAM (DRAM), synchronous DRAM (SDRAM), static RAM (SRAM), or other types of storage devices. Memory 403 may store information including sequences of instructions that are executed by processor 401, or any other device. For example, executable code and/or data of a variety of operating systems, device drivers, firmware (e.g., input output basic system or BIOS), and/or applications can be loaded in memory 403 and executed by processor 401. An operating system can be any kind of operating systems, such as, for example, Windows® operating system from Microsoft®, Mac OS®/iOS® from Apple, Android® from Google®, Linux®, Unix®, or other real-time or embedded operating systems such as VxWorks.

System 400 may further include IO devices such as devices (e.g., 405, 406, 407, 408) including network interface device(s) 405, optional input device(s) 406, and other optional IO device(s) 407. Network interface device(s) 405 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 406 may include a mouse, a touch pad, a touch sensitive screen (which may be integrated with a display device of optional graphics subsystem 404), a pointer device such as a stylus, and/or a keyboard (e.g., physical keyboard or a virtual keyboard displayed as part of a touch sensitive screen). For example, input device(s) 406 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 407 may include an audio device. An audio device may include a speaker and/or a microphone to facilitate voice-enabled functions, such as voice recognition, voice replication, digital recording, and/or telephony functions. Other IO devices 407 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. IO device(s) 407 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 410 via a sensor hub (not shown), while other devices such as a keyboard or thermal sensor may be controlled by an embedded controller (not shown), dependent upon the specific configuration or design of system 400.

To provide for persistent storage of information such as data, applications, one or more operating systems and so forth, a mass storage (not shown) may also couple to processor 401. In various embodiments, to enable a thinner and lighter system design as well as to improve system responsiveness, this mass storage may be implemented via a solid state device (SSD). However, in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 401, e.g., via a serial peripheral interface (SPI). This flash device may provide for non-volatile storage of system software, including a basic input/output software (BIOS) as well as other firmware of the system.

Storage device 408 may include computer-readable storage medium 409 (also known as a machine-readable storage medium or a computer-readable medium) on which is stored one or more sets of instructions or software (e.g., processing module, unit, and/or processing module/unit/logic 428) embodying any one or more of the methodologies or functions described herein. Processing module/unit/logic 428 may represent any of the components described above. Processing module/unit/logic 428 may also reside, completely or at least partially, within memory 403 and/or within processor 401 during execution thereof by system 400, memory 403 and processor 401 also constituting machine-accessible storage media. Processing module/unit/logic 428 may further be transmitted or received over a network via network interface device(s) 405.

Computer-readable storage medium 409 may also be used to store some software functionalities described above persistently. While computer-readable storage medium 409 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of embodiments disclosed herein. The term "computer-readable storage medium" shall accordingly be taken to include, but not be limited to, solid-state memories, and optical and magnetic media, or any other non-transitory machine-readable medium.

Processing module/unit/logic 428, components and other features described herein can be implemented as discrete hardware components or integrated in the functionality of hardware components such as ASICS, FPGAs, DSPs or similar devices. In addition, processing module/unit/logic 428 can be implemented as firmware or functional circuitry within hardware devices. Further, processing module/unit/logic 428 can be implemented in any combination hardware devices and software components.

Note that while system 400 is illustrated with various components of a data processing system, it is not intended to represent any particular architecture or manner of interconnecting the components; as such details are not germane to embodiments disclosed herein. It will also be appreciated that network computers, handheld computers, mobile phones, servers, and/or other data processing systems which have fewer components or perhaps more components may also be used with embodiments disclosed herein.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments disclosed herein also relate to an apparatus for performing the operations herein. Such a computer program is stored in a non-transitory computer readable medium. A machine-readable medium includes any mechanism for storing information in a form readable by a machine (e.g., a computer) in a transitory or non-transitory manner. For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments disclosed herein are not described with reference to any particular programming language. It will be appreciated that a variety of programming languages may be used to implement the teachings of embodiments disclosed herein.

In the foregoing specification, embodiments have been described with reference to specific exemplary embodiments thereof. It will be evident that various modifications may be made thereto without departing from the broader spirit and scope of the embodiments disclosed herein as set forth in the following claims. The specification and drawings are, accordingly, to be regarded in an illustrative sense rather than a restrictive sense.

What is claimed is:

1. A method for managing operation of a data processing system, the method comprising:
   identifying, by a power supply, a change in a sensed quantity that triggers an alert;
   obtaining, by a logic device and directly from the power supply, a report regarding the sensed quantity via a channel;
   identifying, by the logic device and based on the report, a provider of the report, a source that caused the change in the sensed quantity, and a value for at least one parameter that caused the change in the sensed quantity to be identified;
   selecting, by the logic device and based on the provider, the source, and the value, an action set; and
   performing, by the logic device, the action set to attempt to remediate the alert.

2. The method of claim 1, wherein the channel is a modular peripheral sideband tunneling interface.

3. The method of claim 2, wherein the report is sent via a virtual wire over the channel, the logic device associates the virtual wire with the source that caused the change in the sensed quantity, and the sensed quantity is a temperature that exceeds a threshold which triggers the alert.

4. The method of claim 3, wherein performing the action set comprises:
making an assertion, by the logic device, that a managed device is over temperature; and
reducing, by the managed device and responsive to the assertion, power consumption while the assertion is in force.

5. The method of claim 4, further comprising:
identifying, by the power supply, a second change in the sensed quantity that resolves the alert;
providing, by the power supply and to the logic device, a second report regarding the second change in the sensed quantity via the channel;
performing, by the logic device, a second action set to remove the assertion.

6. The method of claim 2, wherein the modular peripheral sideband tunneling interface operates in real-time.

7. The method of claim 6, wherein the modular peripheral sideband tunneling interface is a point to point interface.

8. The method of claim 1, further comprising:
prior to identifying the change in the sensed quantity:
configuring, by a management controller or the logic device, the power supply to provide instances of the report when the sensed quantity exceeds the threshold.

9. A non-transitory machine-readable medium having instructions stored therein, which when executed by a processor, cause the processor to perform operations for managing operation of a data processing system, the operations comprising:
obtaining, by a logic device and directly from a power supply of the data processing system via a channel, a report regarding a change in a sensed quantity that triggers an alert for the power supply;
identifying, by the logic device and based on the report, a provider of the report, a source that caused the change in the sensed quantity, and a value for at least one parameter that caused the change in the sensed quantity to be identified;
selecting, by the logic device and based on the provider, the source, and the value, an action set; and
performing, by the logic device, the action set to attempt to remediate the alert.

10. The non-transitory machine-readable medium of claim 9, wherein the channel is a modular peripheral sideband tunneling interface, and the sensed quantity is a temperature that exceeds a threshold which triggers the alert.

11. The non-transitory machine-readable medium of claim 10, wherein the report is sent via a virtual wire over the channel, and the logic device associates the virtual wire with the source that caused the change in the sensed quantity.

12. The non-transitory machine-readable medium of claim 11, wherein performing the action set comprises:
making an assertion, by the logic device, that a managed device is over temperature; and
reducing, responsive to the assertion, power consumption by the managed device while the assertion is in force.

13. The non-transitory machine-readable medium of claim 12, wherein the operations further comprise:
obtaining, by the logic device, a second report regarding a second change in the sensed quantity that resolves the alert; and
performing, by the logic device, a second action set to remove the assertion.

14. The non-transitory machine-readable medium of claim 10, wherein the modular peripheral sideband tunneling interface operates in real-time.

15. The non-transitory machine-readable medium of claim 14, wherein the modular peripheral sideband tunneling interface is a point to point interface.

16. The non-transitory machine-readable medium of claim 9, further comprising:
prior to identifying the change in the sensed quantity:
configuring, by a management controller or the logic device, the power supply to provide instances of the report when the sensed quantity exceeds the threshold.

17. A data processing system, comprising:
a power supply adapted to identify a change in a sensed quantity that triggers an alert; and
a logic device adapted to:
obtain, directly from the power supply via a channel, a report regarding a change in a sensed quantity that triggers an alert for a power supply of the data processing system;
identify, based on the report, a provider of the report, a source that caused the change in the sensed quantity, and a value for at least one parameter that caused the change in the sensed quantity to be identified;
select, based on the provider, the source, and the value, an action set; and
perform the action set to attempt to remediate the alert.

18. The data processing system of claim 17, wherein the channel is a modular peripheral sideband tunneling interface, and the sensed quantity is a temperature that exceeds a threshold which triggers the alert.

19. The data processing system of claim 18, wherein the report is sent via a virtual wire over the channel, and the logic device associates the virtual wire with the source that caused the change in the sensed quantity.

20. The data processing system of claim 19, wherein performing the action set comprises:
making an assertion, by the logic device, that a managed device is over temperature; and
reducing, responsive to the assertion, power consumption by the managed device while the assertion is in force.

* * * * *